United States Patent
Shimizu et al.

(10) Patent No.: US 10,382,643 B2
(45) Date of Patent: Aug. 13, 2019

(54) IMAGE PROCESSING DEVICE AND NON-TRANSITORY COMPUTER-READABLE MEDIUM

(71) Applicant: FUJI XEROX CO., LTD., Tokyo (JP)

(72) Inventors: Kosuke Shimizu, Kanagawa (JP); Kazunori Sato, Kanagawa (JP); Eisuke Nozawa, Kanagawa (JP); Motohiro Asano, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/805,788

(22) Filed: Nov. 7, 2017

(65) Prior Publication Data
US 2018/0332187 A1 Nov. 15, 2018

(30) Foreign Application Priority Data
May 10, 2017 (JP) .................................. 2017-093620

(51) Int. Cl.
*H04N 1/047* (2006.01)
*H04N 1/409* (2006.01)
*H04N 1/48* (2006.01)

(52) U.S. Cl.
CPC .......... *H04N 1/0473* (2013.01); *H04N 1/409* (2013.01); *H04N 1/48* (2013.01); *H04N 2201/0081* (2013.01); *H04N 2201/04748* (2013.01)

(58) Field of Classification Search
CPC ............................. H04N 1/409; H04N 1/0473
See application file for complete search history.

(56) References Cited

U.S. PATENT DOCUMENTS

| | | | |
|---|---|---|---|
| 2015/0244891 A1* | 8/2015 | Togashi | H04N 1/484 358/509 |
| 2015/0264213 A1* | 9/2015 | Tai | H04N 1/6008 358/509 |
| 2016/0314738 A1* | 10/2016 | Shiohara | G09G 3/2096 |
| 2017/0269501 A1* | 9/2017 | Kamikura | G03G 15/043 |

FOREIGN PATENT DOCUMENTS

| | | |
|---|---|---|
| JP | 2008-131260 A | 6/2008 |
| JP | 2008131260 A * | 6/2008 |

* cited by examiner

*Primary Examiner* — Ted W Barnes
(74) *Attorney, Agent, or Firm* — Oliff PLC

(57) ABSTRACT

An image processing device includes a reception unit that receives an input image signal, and a synchronization signal used to generate an output image signal on a basis of the input image signal. In a case in which, after receiving the synchronization signal, the reception unit does not receive a next synchronization signal within a predetermined reception period, the reception unit conducts an automatic reception process that treats the next synchronization signal as being received.

6 Claims, 9 Drawing Sheets

FIG. 2

| A | | | | | |
|---|---|---|---|---|---|
| D5 | S0 | S1 | S2 | | IN1[3] |
| D4 | IN1[4] | IN1[5] | IN1[6] | IN1[1] | IN1[2] |
| D3 | S4 | IN2[0] | IN2[1] | IN1[8] | IN1[9] | S3 |
| D2 | IN2[6] | IN2[7] | IN2[8] | IN2[3] | IN2[4] | IN2[5] |
| D1 | IN3[3] | IN3[4] | IN3[5] | IN3[0] | IN3[1] | IN3[2] |
| DCLK | H | H | L | L | H | H |

(Note: table structure as best reconstructed from figure)

IMAGE PROCESSING DEVICE AND NON-TRANSITORY COMPUTER-READABLE MEDIUM

CROSS-REFERENCE TO RELATED APPLICATIONS

This application is based on and claims priority under 35 USC 119 from Japanese Patent Application No. 2017-093620 filed May 10, 2017.

BACKGROUND

Technical Field

The present invention relates to an image processing device and a non-transitory computer-readable medium.

SUMMARY

According to an aspect of the invention, there is provided an image processing device including a reception unit that receives an input image signal, and a synchronization signal used to generate an output image signal on a basis of the input image signal. In a case in which, after receiving the synchronization signal, the reception unit does not receive a next synchronization signal within a predetermined reception period, the reception unit conducts an automatic reception process that treats the next synchronization signal as being received.

BRIEF DESCRIPTION OF THE DRAWINGS

Exemplary embodiments of the present invention will be described in detail based on the following figures, wherein:

FIG. 2 is a diagram illustrating an example of a signal conforming to the LVDS standard;

DETAILED DESCRIPTION

First Exemplary Embodiment

Figure 1:
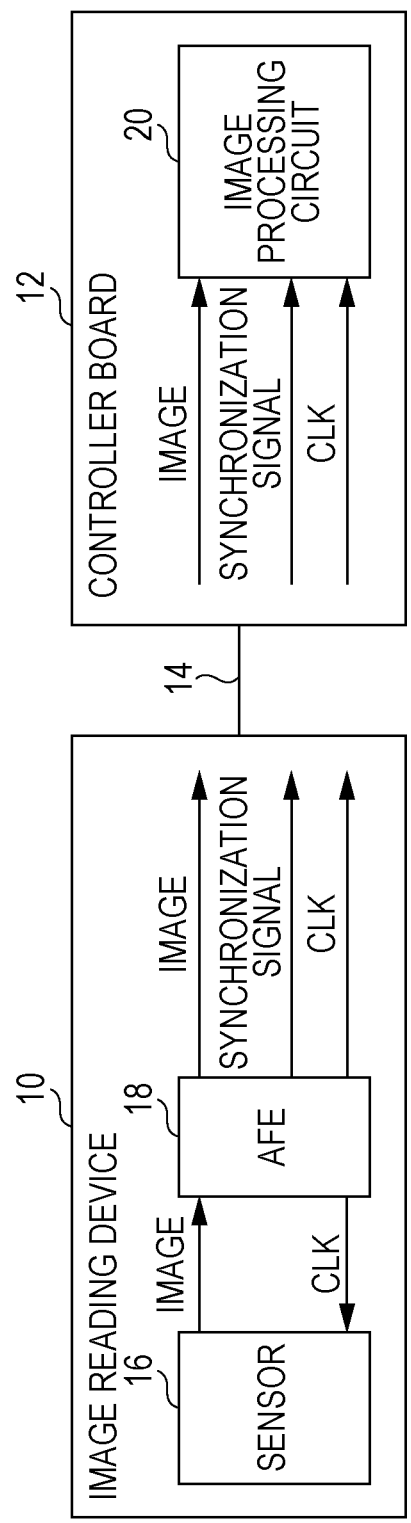
FIG. 1 is a block diagram illustrating an image processing system according to a first exemplary embodiment of the present invention.

FIG. 1 illustrates an example of an image processing system according to a first exemplary embodiment. As an example, the image processing system includes an image reading device 10 provided with a function of reading an image, a controller board 12 provided with a function of processing an image, and a cable 14. An image signal generated due to image reading by the image processing device 10 is sent to the controller board 12 through the cable 14.

The image reading device 10 includes a sensor 16 and an analog front-end (AFE) 18.

The sensor 16 is made up of a CCD or CIS, for example, and is provided with a function of reading an image. Obviously, a different image reading sensor may also be used as the sensor 16. A base clock signal (CLK) conforming to a predetermined frequency is sent from the AFE 18 to the sensor 16, and the sensor 16 conducts image reading in synchronization with the base clock signal (CLK). With this arrangement, an image signal is generated as an analog signal, in synchronization with the base clock signal (CLK). The image signal is sent from the sensor 16 to the AFE 18.

For the image reading method, a line-sequential method is adopted, for example. With a line-sequential method, the sensor 16 includes a line sensor, turns on red (R) light (linear light), green (G) light (linear light), and blue (B) light (linear light) sequentially in accordance with a predetermined image reading cycle (where the length of one cycle corresponds to the length of one CLK), and uses the line sensor to read an image for each of the colors R, G, and B. By following the reading sequence and cycle, an R-line image signal, a G-line image signal, and a B-line image signal are generated sequentially. For example, each image signal is generated every one CLK. By causing the sensor 16 to read an image while moving the sensor 16 in a main scanning direction (a direction that crosses (for example, a direction orthogonal to) the direction in which the line sensors extend), an image is read in units of lines, with image signals of different colors (the R-line image signal, G-line image signal, and B-line image signal) being generated for every line.

As a method other than the line-sequential method, a point-sequential method may also be adopted. With a point-sequential method, the sensor 16 turns on R light (point light), G light (point light), and B light (point light) sequentially in accordance with a predetermined image reading cycle (where the length of one cycle corresponds to the length of one CLK), and reads an image for each of the colors R, G, and B. By following the reading sequence and cycle, an R image signal, a G image signal, and a B image signal are generated sequentially. For example, each image signal is generated every one CLK. By causing the sensor 16 to read an image while moving the sensor 16, an image is read in units of pixels, with the R image signal, G image signal, and B image signal) being generated for every pixel. For example, by causing the sensor 16 to read an image while moving the sensor 16 in a sub scanning direction, and additionally causing the sensor 16 to move in a main scanning direction (for example, a direction orthogonal to the sub scanning direction), an image of each pixel is read.

The AFE 18 is provided with a function of receiving the image signal from the sensor 16 as an analog signal, and by applying processing such as offset adjustment and amplification to the image signal, generating an image signal as a digital signal.

Also, the AFE 18 synchronizes with the base clock signal (CLK), and generates a synchronization signal indicating the reading start time of each image. With this arrangement, the synchronization signal is generated every one CLK. In the case in which a line-sequential method is adopted, the AFE 18 generates a synchronization signal indicating the reading start time of the image of each line. For example, the AFE 18 generates a synchronization signal corresponding to the R-line image signal (a signal indicating the reading start time of the R-line image signal), a synchronization signal corresponding to the G-line image signal (a signal indicating the reading start time of the G-line image signal), and a synchronization signal corresponding to the B-line image signal (a signal indicating the reading start time of the B-line image signal). In the case in which a point-sequential method is adopted, the AFE 18 generates a synchronization signal indicating the reading start time of the image of each pixel. The image signal and synchronization signal of each color as well as the base clock signal (CLK) are sent from the image reading device 10 to the controller board 12 through the cable 14. Hereinafter, the image generated by the AFE 18 as a digital signal will be designated the "input image signal".

In the following, as an example, suppose that an image has been read by a line-sequential method. In this case, a horizontal synchronizing signal (HSYNC) is used as the line synchronization signal, for example. When generating an output image signal on the basis of the input image signal of each line (for, example, when drawing an image using the input image signal), this synchronization signal (HSYNC) is utilized to align the image of each line with respect to the main scanning direction.

The controller board 12 includes an image processing circuit 20 as an example of an image processing device. The image processing circuit 20 is provided with a function of receiving an input image signal as a digital signal sent from the image reading device 10, and applying image processing to the input image signal. For example, the image processing circuit 20 receives an input image signal and corresponding synchronization signal for each color, as well as the base clock signal (CLK), and by utilizing the synchronization signals, combines the R-line input image signal, the G-line input image signal, and the B-line input image signal to thereby generate an output image signal.

The output image signal is output to a printer, for example, which is an example of an image output device. In the printer, printing may be performed in accordance with the output image signal. As another example, the output image signal may be output to a display device, and in the display device, an image may be displayed in accordance with the output image signal. An image processing system according to the present exemplary embodiment may be built into a printer, or may be built into a display device or the like.

In the first exemplary embodiment, a transmission method conforming to the low-voltage differential signaling (LVDS) standard is used as the image transmission method. FIG. 2 illustrates an example of a signal conforming to the LVDS standard (hereinafter designated an "LVDS signal"). An LVDS signal is made up of a 5-bit signal and a 30-bit input image signal. In the 5-bit signal, there is embedded a signal such as a signal indicating "H", a signal indicating "L", or a signal toggled at a predetermined timing like a synchronization signal. In the first exemplary embodiment, as described later, a signal of several of the 5 bits is used as the synchronization signal described above. Note that although the LVDS standard is used, a standard that may include a signal of multiple bits other than the input image signal may also be used, even if a standard other than the LVDS standard.

Figure 3:
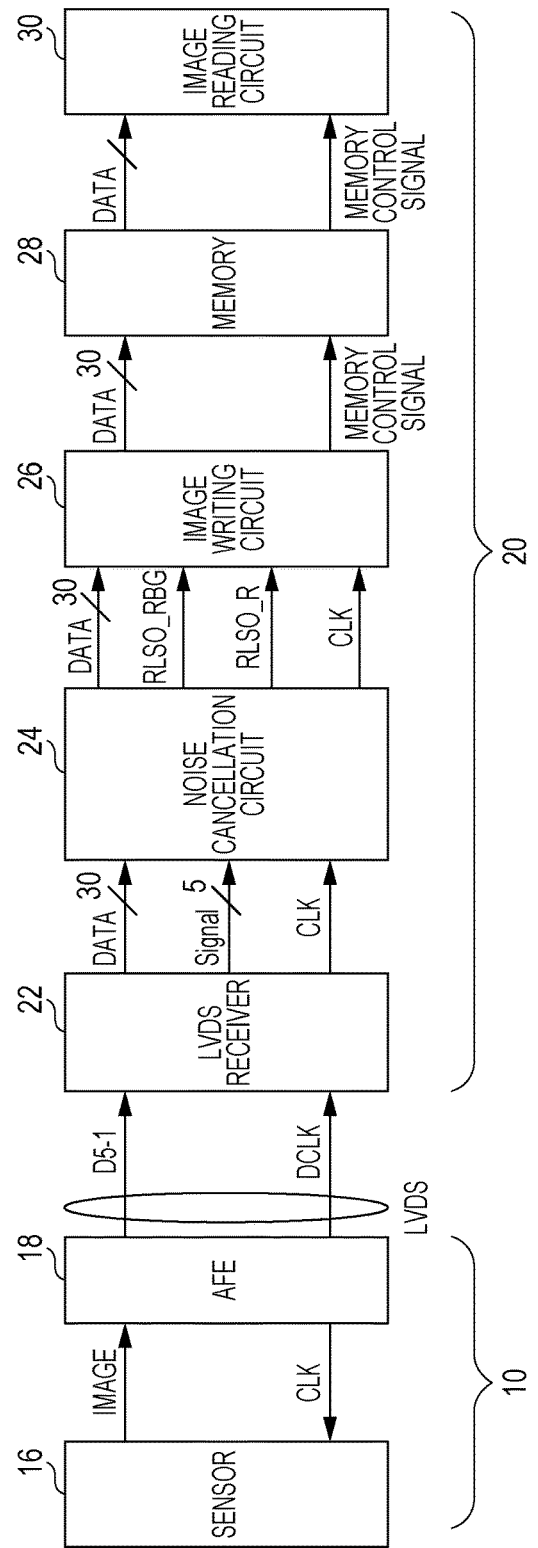
FIG. 3 is a block diagram illustrating an image processing circuit according to the first exemplary embodiment.

Hereinafter, the image processing circuit 20 will be described in detail with reference to FIG. 3. FIG. 3 is a block diagram illustrating the image processing circuit 20. The image processing circuit 20 includes an LVDS receiver 22, a noise cancellation circuit 24, an image writing circuit 26, memory 28, and an image reading circuit 30.

The LVDS receiver 22 is provided with a function of receiving an LVDS signal (a 5-bit signal and a 30-bit input image signal) sent from the AFE 18 of the image reading device 10 through the cable 14, converting the differential signals into a single signal, and extracting the 30-bit input image signal (DATA) and the 5-bit signal (Signal). The 30-bit input image signal and the 5-bit signal are output to the noise cancellation circuit 24 downstream. Also, the LVDS receiver 22 receives the base clock signal (DCLK) sent from the AFE 18, and outputs the base clock signal (CLK) to the noise cancellation circuit 24.

The noise cancellation circuit 24 is provided with a function of receiving the 30-bit input image signal and the 5-bit signal, and by removing the effects of noise, outputting a noise-canceled input image signal and synchronization signal. The noise is electrical noise such as electrostatic noise, for example, and is superimposed onto the signal during transmission. The processing by the noise cancellation circuit 24 will be described in detail later. Also, the base clock signal (CLK) is output from the noise cancellation circuit 24 to the image writing circuit 26.

The image writing circuit 26 is provided with a function of receiving the input image signal, the synchronization signal, and the base clock signal (CLK) output from the noise cancellation circuit 24, and writing (storing) the input image signal in the memory 28. Specifically, the image writing circuit 26 utilizes the synchronization to write the R-line input image signal in R-memory, write the G-line input image signal in G-memory, and write the B-line input image signal in B-memory in the memory 28.

The image reading circuit 30 is provided with a function of reading out the input image signal written (stored) in the memory 28 as an output image signal, and outputting the output image signal. Specifically, the image reading circuit 30 reads out the R-line input image signal from the R-memory, reads out the G-line input image signal from the G-memory, and reads out the B-line input image signal from the B-memory, combines each of the input image signals to generate an output image signal, and outputs that output image signal. The image reading circuit 30 generates and output an output image signal for each line by reading out each of the input image signals for each line. The output image signal may be output to a printer, for example, and printing may be performed in accordance with the output image signal in the printer, or the output image signal may be output to a display device, and an image may be displayed in accordance with the output image signal in the display device.

Figure 4:
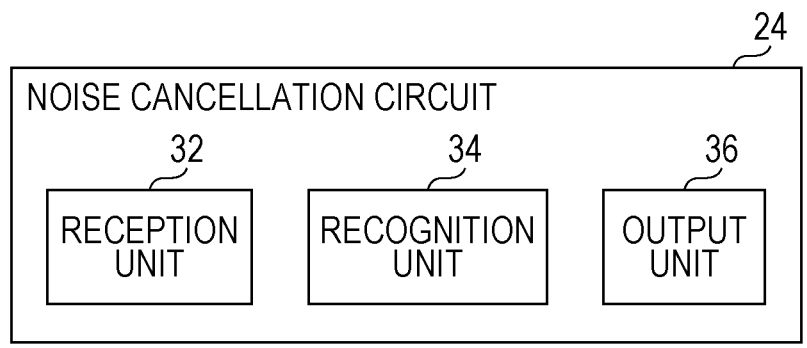
FIG. 4 is a block diagram illustrating a noise cancellation circuit according to the first exemplary embodiment.

Hereinafter, the noise cancellation circuit 24 will be described in detail with reference to FIG. 4. FIG. 4 is a block diagram illustrating a noise cancellation circuit 24 according to the first exemplary embodiment. The noise cancellation circuit 24 includes a reception unit 32, a recognition unit 34, and an output unit 36.

The reception unit 32 is provided with a function of receiving the 30-bit input image signal, the synchronization signal for each color, and the base clock signal (CLK) sent from the LVDS receiver 22. As described above, the sensor 16 reads an image in accordance with a predetermined image reading cycle (a cycle corresponding to the length of one CLK), and the input image signal, synchronization signal, and base clock signal (CLK) are sent periodically from the image reading device 10 to the controller board 12. The reception unit 32 receives the input image signal, synchronization signal, and base clock signal (CLK) sent periodically in this way.

The recognition unit 34 is provided with a function of recognizing a genuine synchronization signal used to generate the output image signal on the basis of the input image signal.

The output unit 36 is provided with a function of outputting the input image signal and the synchronization signal received by the reception unit 32 to the image writing circuit 26 downstream.

Hereinafter, the processing by the recognition unit 34 will be described in detail.

In the first exemplary embodiment, a synchronization signal having a signal pattern is used as the synchronization signal. Also, the synchronization signal for each color has a different signal pattern. Such synchronization signals are expressed using the 5-bit signal above. For example, information from 4 bits out of the 5 bits is utilized to generate a different synchronization signal for each color. Specifically, the synchronization signal for R is expressed by "0101" (a prescribed pattern for R), the G synchronization signal is expressed by "1010" (a prescribed pattern for G), and the synchronization signal for B is expressed by "1001" (a prescribed pattern for B). These synchronization signals are generated by the AFE 18.

The recognition unit 34 receives a synchronization signal having one of the above signal patterns, and on the basis of the signal pattern, identifies the color expressed by the input image signal corresponding to the synchronization signal (that is, the color corresponding to the synchronization signal).

Specifically, in the case in which the signal pattern of the received synchronization signal corresponds to the prescribed pattern for R (for example, in the case in which the signal pattern matches the prescribed pattern for R), the recognition unit 34 identifies the color corresponding to that synchronization signal as "R (red)", and recognizes that synchronization signal as a genuine synchronization signal for R. Similarly, in the case in which the signal pattern corresponds to the prescribed pattern for G (for example, in the case in which the signal pattern matches the prescribed pattern for G), the recognition unit 34 identifies the color corresponding to that synchronization signal as "G (green)", and recognizes that synchronization signal as a genuine synchronization signal for G. Similarly, in the case in which the signal pattern corresponds to the prescribed pattern for B (for example, in the case in which the signal pattern matches the prescribed pattern for B), the recognition unit 34 identifies the color corresponding to that synchronization signal as "B (blue)", and recognizes that synchronization signal as a genuine synchronization signal for B.

The output unit 36 outputs the synchronization signal recognized as a genuine synchronization signal by the recognition unit 34, and the input image signal corresponding to the synchronization signal, to the image writing circuit 26 downstream.

The image writing circuit 26 receives the input image signal and synchronization signal (genuine synchronization signal) output from the output unit 36, and writes the input image signal in the memory 28. As above, since the color corresponding to each synchronization signal is identified on the basis of a signal pattern included in the synchronization signal, the image writing circuit 26 may utilize the identification result to write the R-line input image signal in the R-memory, write the G-line input image signal in the G-memory, and write the B-line input image signal in the B-memory. The image reading circuit 30 reads out the input image signal for each color written in this way from the memory 28 for each line, and combines the input image signals for the respective colors on every line to generate and output an output image signal. With this arrangement, an output image signal for each line is generated.

On the other hand, in the case in which the signal pattern of the synchronization signal received by the reception unit 32 does not correspond to any of the prescribed pattern for R, the prescribed pattern for G, or the prescribed pattern for B, the recognition unit 34 does not recognize that synchronization signal as a genuine synchronization signal (for example, the recognition unit 34 recognizes that synchronization signal as a non-genuine synchronization signal). In this case, the output unit 36 does not output the synchronization signal not recognized as a genuine synchronization signal, or the input image signal corresponding to the synchronization signal, to the image writing circuit 26. The image writing circuit 26 writes input image signals corresponding to genuine synchronization signals in the memory 28, and the image reading circuit 30 reads out input image signals written in the memory 28 to generate and output an output image signal. In this way, an output image signal is generated without using an input image signal corresponding to a synchronization signal not recognized as a genuine synchronization signal.

As above, according to the first exemplary embodiment, a synchronization signal is made up of a multi-bit signal pattern, and the synchronization signal is identified by the signal pattern. For this reason, even in the case in which noise is superimposed onto the synchronization signal, the input or non-input of the synchronization signal is recognized more accurately compared to the case in which the synchronization signal is made up of a 1-bit signal, and the occurrence of image misalignment (image shift) or misregistration (misalignment of the respective color components of an image) caused by misrecognition of the synchronization signal is reduced. Also, since the color indicated by the synchronization signal is identified more accurately compared to the case in which the synchronization signal is made up of a 1-bit signal, the color expressed by the input image signal corresponding to the synchronization signal is identified more accurately.

At this point, consider a case in which noise is superimposed onto a synchronization signal (for example, the synchronization signal for B) for a certain line (for example, the 1st line), and the synchronization signal is not input into the image processing circuit 20. For example, suppose that respective images are read in order of R line, G line, B line. In this case, the first synchronization signal corresponds to the R-line input image signal, the second synchronization signal corresponds to the G-line input image signal, and the third synchronization signal corresponds to the B-line input image signal. Thereafter, synchronization signals and input image signals are generated and output in that order.

First, processing according to a comparative example will be described. In the comparative example, suppose that the synchronization signal is made up of a 1-bit signal (for example, a signal indicating "H" or "L"), and suppose that the input or non-input of the synchronization signal is recognized by "H" and "L". In the case in which noise is superimposed onto the synchronization signal for B on the first line, and that synchronization signal is not input into the image processing circuit, the synchronization signal input next after the synchronization signal for B (the next synchronization signal being the synchronization signal for R on the next line, namely, the second line) is recognized as the synchronization signal for B on the first line. In that case, the R-line input image signal for the first line, the G-line input image signal for the first line, and the R-line input image signal for the second line are recognized as the input image signals for the first line, and an output image signal is generated on the basis of these input image signals. The R-line input image signal for the second line is a signal expected to be output or drawn as the second line, but in the above case, becomes output or drawn as the first line. In other words, the position of the R-line input image for the second line is shifted (described more specifically, the position (drawing position) of the R-line input image is shifted to the position of the first line in the main scanning direction), thereby causing the color to be reproduced to become shifted from the original color. On the second and subsequent lines, image misalignment and misregistration occur similarly. In this way, in the comparative example, in the case in which noise is superimposed onto the synchronization signal for a certain line, and that synchronization signal is not input into the image processing circuit, image misalignment and misregistration occur on that line and other lines.

In the first exemplary embodiment, the synchronization signal for each color is identified on the basis of a signal pattern, and thus in the case in which the synchronization signal for B on the first line is not input, the recognition unit 34 recognizes that the synchronization signal for B on the first line has not been received by the reception unit 32. In this case, in the case in which the synchronization signal for R and the synchronization signal for G on the first line have been recognized as genuine synchronization signals, the image writing circuit 26 writes the R-line input image signal and the G-line input image signal for the first line in the memory 28, and the image reading circuit 30 reads out and combines the R-line input image signal and the G-line input image signal from the memory 28 to generate and output an output image signal. For the next line, namely, the second line, in the case in which the synchronization signal for R, the synchronization signal for G, and the synchronization signal for B are recognized as genuine synchronization signals, the R-line input image signal, the G-line input image signal, and the B-line input image signal for the second line are written in the memory 28, and these input image signals are read out to generate an output image signal. In this way, for the second line, an output image signal is generated on the basis of the input image signals for the second line, and thus the image of the second line is generated correctly. The third and subsequent lines are also similar. In this way, even in the case in which noise is superimposed onto a synchronization signal, the target affected by such noise is the image of the line corresponding to the synchronization signal affected by the noise, whereas the images of the subsequent lines are not affected by the noise. As a result, the occurrence of image misalignment and misregistration is reduced compared to the comparative example above.

Also, according to the first exemplary embodiment, since the color indicated by the synchronization signal is identified, processing like the following may also be conducted. For example, when the reception unit 32 receives three synchronization signals in succession, in the case in which multiple synchronization signals for the same color are included among those three synchronization signals, the synchronization signal received earlier by the reception unit 32 among the multiple synchronization signals is identified as being a synchronization signal for a different line than the synchronization signal received later. For example, in the case of being unaffected by noise or the like, the reception unit 32 receives a synchronization signal for R, a synchronization signal for G, and a synchronization signal for B in succession. For this reason, multiple synchronization signals for the same color are not included among these three synchronization signals. On the other hand, in the case in which the reception unit 32 receives a synchronization signal for R, a synchronization signal for G, and a synchronization signal for R in succession due to the effects of noise or the like, the earlier synchronization signal for R and the later synchronization signal for R are identified as being synchronization signals for different lines. Since such identification is possible, the later synchronization signal for R is kept from being misrecognized as a synchronization signal for the previous line.

The above example deals with a color image, but may also deal with a monochrome image. A monochrome image may be an image expressed with the two tones of white and black, or an image expressed by grayscale (for example, an image expressed by 256 tones). Even in the case of dealing with a monochrome image, the synchronization signal has a predetermined signal pattern, and a synchronization signal having the signal pattern is recognized as a genuine synchronization signal. By reading an image on each line, an input image signal (monochrome image signal) for each line is generated, and by using the synchronization signal to draw the input image signal for each line in the main scanning direction, an output image signal is generated. Even in the case in which noise is superimposed onto the synchronization signal, and the synchronization signal is not input into the image processing circuit 20, according to the first exemplary embodiment, the occurrence of image misalignment on each line (image misalignment in the main scanning direction) is reduced compared to the comparative example.

Note that although a line-sequential method is used in the above example, a point-sequential method may also be used. Even in this case, the synchronization signal corresponding to the input image signal is recognized on the basis of a signal pattern. With this arrangement, in the case in which a color image is generated, the occurrence of image misalignment and misregistration is reduced compared to the comparative example, while in the case in which a monochrome image is generated, the occurrence of image misalignment is reduced compared to the comparative example.

Second Exemplary Embodiment

Figure 5:
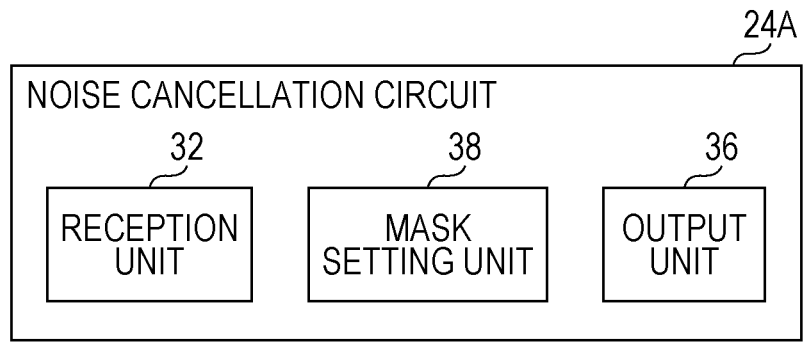
FIG. 5 is a block diagram illustrating a noise cancellation circuit according to the second exemplary embodiment.
Figure 6:
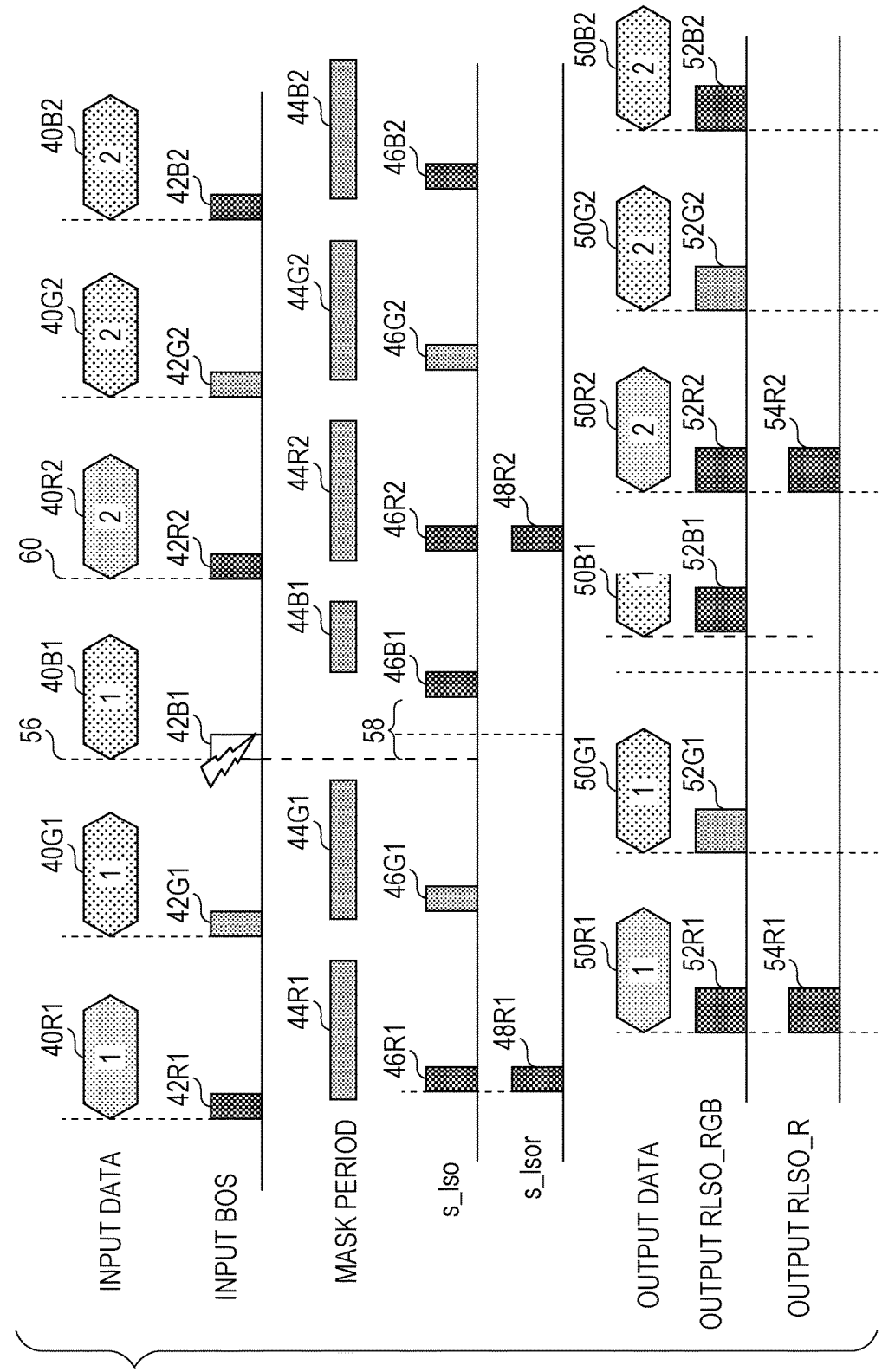
FIG. 6 is a diagram illustrating a timing chart.

Hereinafter, an image processing system according to the second exemplary embodiment will be described with reference to FIGS. 5 and 6. FIG. 5 is a block diagram illustrating a noise cancellation circuit 24A according to the second exemplary embodiment. FIG. 6 is a diagram illustrating a timing chart.

The image processing system according to the second exemplary embodiment includes the noise cancellation circuit 24A illustrated in FIG. 5 instead of the noise cancellation circuit 24 according to the first exemplary embodiment. The configuration other than the noise cancellation circuit 24A is the same as the configuration according to the first exemplary embodiment. Hereinafter, the noise cancellation circuit 24A will be described.

The noise cancellation circuit 24A includes a reception unit 32, a mask setting unit 38, and an output unit 36. Since the reception unit 32 and the output unit 36 are provided with the same functions as in the first exemplary embodiment, description thereof will be reduced or omitted.

The mask setting unit 38 is provided with a function of setting a mask period that prohibits the reception of a synchronization signal from the reception unit 32 after the reception unit 32 receives a synchronization signal (corresponding to an example of a reception prohibition period).

For example, the mask setting unit 38 sets a mask period for each color. In the second exemplary embodiment, the length of the mask period is the same for each color. For example, the time at which the reception unit 32 receives a synchronization signal is set as the start point of the mask period. Also, the length of the mask period is less than the length of the base clock signal (the length of one CLK), for example. Described in further detail, the length of the mask period is determined on the basis of the length of the 1-line image reading time by the sensor 16 (the length of time taken to read an image of one color line), and is less than the length of the image reading time, for example. In other words, the mask period is set spanning from the time at which the reception unit 32 receives a synchronization signal (start point) until a time before the time at which the reception unit 32 is predicted to receive the next synchronization signal (end point). Since the sensor 16 conducts image reading in a predetermined color order in accordance with a predetermined image reading cycle (in which the length of one cycle corresponds to the length of one CLK), the timing at which the input image signal and the synchronization signal for each color are received by the reception unit 32 is predetermined, and that timing is predicted. Described in further detail, when the initial synchronization signal (for example, the synchronization signal for R on the first line) is received by the reception unit 32, the time of that reception is treated as a start point, and the timings of the reception of subsequent synchronization signals by the reception unit 32 are predicted. Since the image reading by the sensor 16 is conducted every one CLK, a synchronization signal is predicted to be received by the reception unit 32 every one CLK. The mask setting unit 38 sets a mask period having a fixed length in accordance with the image reading cycle. In other words, the mask setting unit 38 sets a mask period having a fixed length every one CLK. Note that the reception unit 32 still receives the input image signal even during the mask period.

Hereinafter, processing by the mask setting unit 38 will be described in detail with reference to FIG. 6. FIG. 6 illustrates an example of input image signals and synchronization signals input into the noise cancellation circuit 24A, and input image signals and synchronization signals output from the noise cancellation circuit 24A.

The input data 40R1, 40G1, and 40B1 represent the input image signals for the first line. The input data 40R1 represents the R-line input image signal, the input 40G1 represents the G-line input image signal, and the input data 40B1 represents the B-line input image signal.

Similarly, the input data 40R2, 40G2, and 40B2 represent the input image signals for the second line. The input data 40R2 represents the R-line input image signal, the input 40G2 represents the G-line input image signal, and the input data 40B2 represents the B-line input image signal.

Also, the synchronization signals 42R1, 42G1, and 42B1 (input BOS) represent the synchronization signals for the first line. The synchronization signal 42R1 is the synchronization signal corresponding to the input data 40R1, the synchronization signal 42G1 is the synchronization signal corresponding to the input data 40G1, and the synchronization signal 42B1 is the synchronization signal corresponding to the input data 40B1.

Similarly, the synchronization signals 42R2, 42G2, and 42B2 (input BOS) represent the synchronization signals for the second line. The synchronization signal 42R2 is the synchronization signal corresponding to the input data 40R2, the synchronization signal 42G2 is the synchronization signal corresponding to the input data 40G2, and the synchronization signal 42B2 is the synchronization signal corresponding to the input data 40B2.

The reception unit 32 receives input data as an input image signal, a synchronization signal, and the base clock signal (CLK). Every one CLK, an image of each color is read in the order of R line, G line, B line, input data (an input image signal) for each color and a corresponding synchronization signal are generated, and the input data for each color, the synchronization signal, and the base clock signal (CLK) are input into the reception unit 32. In the case of being unaffected by noise or the like, the reception unit 32 receives input data, a synchronization signal, and the base clock signal (CLK) every one CLK.

In the case in which the reception unit 32 receives a synchronization signal, after the reception of the synchronization signal, the mask setting unit 38 treats the reception as a start point, and sets a mask period that acts as a reception prohibition period. The mask setting unit 38 sets a mask period for each color. The reception unit 32 does not receive a synchronization signal during the mask period, and instead receives a synchronization signal during the time after the mask period elapses but before the next mask period is set.

For example, in the case in which the reception unit 32 receives the synchronization signal 42R1 for R, the mask setting unit 38 treats the time of the reception of the synchronization signal 42R1 as the start point, and sets a mask period 44R1 having a predetermined length of time. The length of the mask period 44R1 is less than the length of the image reading time taken to generate the next input image signal, namely the input data 40G1 (less than the length of the image reading time for one G line by the sensor 16). Consequently, the mask period 44R1 is set spanning from the time at which the reception unit 32 receives the synchronization signal 42R1 (start point) until the time before the time at which the reception unit 32 is predicted to receive the next synchronization signal 42G1 (end point). The reception unit 32 does not receive a synchronization signal during the mask period 44R1, and instead receives the next synchronization signal during the time after the mask period 44R1 elapses but before the next mask period 44G1 is set. By fixing the length of the mask period as above, a mask period is set until the image reading for each color is completed, and during that period, the reception of a synchronization signal by the reception unit 32 is prohibited. Since a mask period is not set in the period when image reading is predicted to be completed and the next synchronization signal is predicted to be input into the reception unit 32, during that period, a synchronization signal is received by the reception unit 32.

After the mask period 44R1 elapses, and the reception unit 32 receives the next synchronization signal 42G1, the mask setting unit 38 treats the time of the reception of the synchronization signal 42G1 as the start point, and sets the mask period 44G1. Thereafter, the flow is similar, and the mask setting unit 38 sets a mask period in accordance with the reception of a synchronization signal by the reception unit 32. With this arrangement, the reception unit 32 repeatedly receives the synchronization signal for R, the synchronization signal for G, and the synchronization signal for B in order.

In FIG. 6, the synchronization signal 46R1 (s_lso) is a signal corresponding to the synchronization signal 42R1 received by the reception unit 32 (for example, the same signal as the synchronization signal 42R1), while the synchronization signal 46G1 (s_lso) is a signal corresponding to the synchronization signal 42G1 received by the reception unit 32 (for example, the same signal as the synchronization signal 42G1). This applies similarly to the other synchronization signals.

The synchronization signal 48R1 (s_lsor) is a signal corresponding to the synchronization signal 46R1 (s_lso), while the synchronization signal 48R2 (s_lsor) is a signal corresponding to the synchronization signal 46R2 (s_lso). The synchronization signals 48R1, 48R2, and so on represent the synchronization signals for R.

The output data 50R1 is the same signal as the input data 40R1 received by the reception unit 32, and the output data 50G1 is the same data as the input data 40G1 received by the reception unit 32. This applies similarly to the other output data. The output data is input image signals output by the output unit 36 to the image writing circuit 26 downstream.

The synchronization signal 52R1 (output RLSO_RGB) is a signal corresponding to the synchronization signal 46R1 (s_lso), while the synchronization signal 52G1 (output RLSO_RGB) is a signal corresponding to the synchronization signal 46G1 (s_lso). This applies similarly to the other synchronization signals. The synchronization signals 52R1, 52G1, and so on are synchronization signals output by the output unit 36 to the image writing circuit 26 downstream.

The synchronization signal 54R1 (output RLSO_R) is a signal corresponding to the synchronization signal 52R1 (output RLSO_RGB), while the synchronization signal 54R2 (output RLSO_R) is a signal corresponding to the synchronization signal 52R2 (output RLSO_RGB). The synchronization signals 54R1, 54R2, and so on represent the synchronization signals for R. The synchronization signals 54R1, 54R2, and so on are synchronization signals output by the output unit 36 to the image writing circuit 26 downstream.

The synchronization signal 54R1 (output RLSO_R) is output to the image writing circuit 26 at the same timing as the synchronization signal 52R1 (output RLSO_RGB), while the synchronization signal 54R2 (output RLSO_R) is output to the image writing circuit 26 at the same timing as the synchronization signal 52R2 (output RLSO_RGB). This applies similarly to the other synchronization signals. By this configuration, the image writing circuit 26 recognizes the synchronization signal 52R1 (output RLSO_RGB) input at the same timing as the synchronization signal 54R1 (output RLSO_R) as a synchronization signal for R, recognizes the synchronization signal 52G1 (output RLSO_RGB) input next as a synchronization signal for G, and recognizes the synchronization signal 52B1 (output RLSO_RGB) input next as a synchronization signal for B. The image writing circuit 26 recognizes the synchronization signals 52R1, 52G1, and 52B1 as synchronization signals for the same line, recognizes the output data 50R1, 50G1, and 50G1 input together with these synchronization signals as input image signals for the same line, and writes the output data 50R1, 50G1, and 50B1 (input image signals) in the memory 28. When the next synchronization signal 52R2 (output RLSO_RGB) and the synchronization signal 54R2 (output RLSO_R) are input into the image writing circuit 26, the image writing circuit 26 recognizes the synchronization signal 52R2 (output RLSO_RGB) as a synchronization signal for R on the next line, and writes the output data (input image signal) in the memory 28, similarly to the above. Thereafter, the process is similar.

Note that even in the first exemplary embodiment, the synchronization signals (s_lso), (s_lsor), (RLSO_RGB), and (RLSO_R) may be generated, the synchronization signals (RLSO_RGB) and (RLSO_R) may be output to the image writing circuit 26 together with output data, and the image writing circuit 26 may write the output data in the memory 28 in accordance with the synchronization signals.

According to the second exemplary embodiment, since a synchronization signal is not received during the mask period, a synchronization signal with superimposed noise, for example, is kept from being received by the reception unit 32. With this arrangement, compared to the case of not setting a mask period, the occurrence of image misalignment and misregistration caused by noise is reduced in the output image.

Additionally, a signal input into the reception unit 32 irrespectively of the image reading cycle is anticipated to be a signal with superimposed noise. Consequently, by setting a mask period in accordance with a predetermined cycle (image reading cycle), the reception unit 32 avoids receiving such signals with superimposed noise. As a result, compared to the case of not setting a mask period, the occurrence of image misalignment and misregistration caused by noise is reduced.

Note that in the second exemplary embodiment, a synchronization signal may also be made up of a 1-bit signal, and the input or non-input of a synchronization signal may be recognized by "H" or "L" level.

Also, the first and second exemplary embodiments may be combined. In this case, a synchronization signal is made up of a 4-bit signal (signal pattern) similarly to the first exemplary embodiment, and the noise cancellation circuit 24A includes the recognition unit 34. For example, in the case in which a synchronization signal received by the reception unit 32 is recognized as a genuine synchronization signal by the recognition unit 34, a mask period is set by treating as the start point the time of the reception of that synchronization signal. In so doing, the incorrect setting of a mask period in accordance with a synchronization signal with superimposed noise is avoided, and compared to the case of not recognizing whether a synchronization signal is genuine or non-genuine, the mask period is set more accurately. As a result, the occurrence of image misalignment and misregistration is reduced.

The above example deals with a color image, but may also deal with a monochrome image. Even in this case, compared to the case of not setting a mask period, the occurrence of image misalignment caused by noise is reduced in the output image.

Note that although a line-sequential method is used in the above example, a point-sequential method may also be used. Even in this case, by setting a mask period, in the case in which a color image is generated, the occurrence of image misalignment and misregistration is reduced compared to the case of not setting a mask period, while in the case in which a monochrome image is generated, the occurrence of image misalignment is reduced compared to the case of not setting a mask period.

Third Exemplary Embodiment

Figure 7:
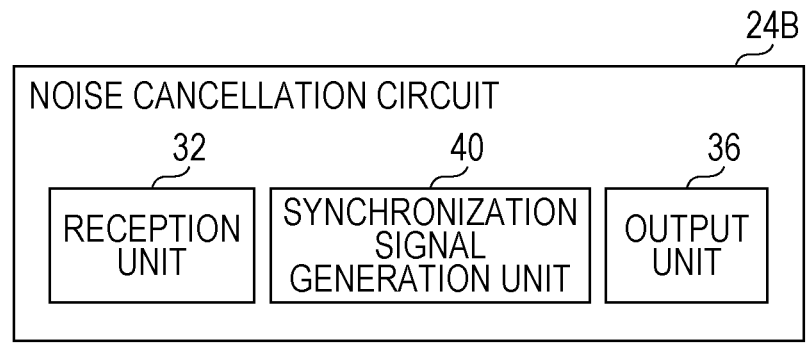
FIG. 7 is a block diagram illustrating a noise cancellation circuit according to the third exemplary embodiment.

Hereinafter, an image processing system according to the third exemplary embodiment will be described with reference to FIGS. 6 and 7. FIG. 7 is a block diagram illustrating a noise cancellation circuit 24B according to the third exemplary embodiment.

The image processing system according to the third exemplary embodiment includes the noise cancellation circuit 24B illustrated in FIG. 7 instead of the noise cancellation circuit 24 according to the first exemplary embodiment. The configuration other than the noise cancellation circuit 24B is the same as the configuration according to the first exemplary embodiment. Hereinafter, the noise cancellation circuit 24B will be described.

The noise cancellation circuit 24B includes a reception unit 32, a synchronization signal generation unit 40, and an output unit 36. Since the reception unit 32 and the output unit 36 are provided with the same functions as in the first exemplary embodiment, description thereof will be reduced or omitted.

The synchronization signal generation unit 40 is provided with a function in which, after the reception unit 32 receives a synchronization signal, in the case in which the next synchronization signal is not received within a predetermined reception period, the synchronization signal generation unit 40 generates the next synchronization signal after the reception period elapses. The reception unit 32 receives the next synchronization signal generated by the synchronization signal generation unit 40. With this configuration, the reception unit 32 conducts an automatic reception process.

As described above, since the sensor 16 conducts image reading in a predetermined color order every one CLK in accordance with a predetermined image reading cycle, the timing at which the input image signal and the synchronization signal for each color are received by the reception unit 32 is predicted. After the reception unit 32 receives a synchronization signal, the synchronization signal generation unit 40 sets a reception period by treating the timing at which the reception unit 32 is predicted to receive the next synchronization signal as a start point, and in the case in which the reception unit 32 does not receive the next synchronization signal within the reception period, the synchronization signal generation unit 40 generates the next synchronization signal after the reception period elapses. The end point of the reception period is set to a time before the timing at which the reception unit 32 is predicted to receive the subsequent synchronization signal after the next (that is, the synchronization signal after the next synchronization signal). In other words, the reception period is set spanning from the time at which the reception unit 32 is predicted to receive the next synchronization signal until a time before the time at which the reception unit 32 is predicted to receive the subsequent synchronization signal after the next.

Hereinafter, processing by the synchronization signal generation unit 40 will be described with reference to FIG. 6. Note that in the third exemplary embodiment, a mask period is not set.

For example, in the case in which the reception unit 32 receives the synchronization signal 42G1, the timing (time 56) at which the reception unit 32 is to receive the next synchronization signal, namely the synchronization signal 42B1, is predicted, and a reception period 58 is set by treating that time 56 as the start point. The reception period 58 is set spanning from the time 56 at which the reception unit 32 is predicted to receive the next synchronization signal, namely the synchronization signal 42B1 (start point) until a time 60 before the time at which the reception unit 32 is predicted to receive the synchronization signal after the next, namely the synchronization signal 42R2 (end point). In the example illustrated in FIG. 6, the next synchronization signal, namely the synchronization signal 42B1, is not received by the reception unit 32 within the reception period 58. In this case, the synchronization signal generation unit 40 generates a synchronization signal 46B1 corresponding to the synchronization signal 42B1. For example, in the case in which the synchronization signal 42B1 is not received by the reception unit 32 due to noise, the synchronization signal 46B1 corresponding to the synchronization signal 42B1 is generated automatically.

Note that the length of the reception period may be shorter than the length of the reception period described above. For example, in the case in which the reception unit 32 does not receive the next synchronization signal 42B1 by the time 56 at which the reception unit 32 is predicted to receive the next synchronization signal 42B1, the synchronization signal generation unit 40 may generate the synchronization signal 46B1 corresponding to the synchronization signal 42B1.

The output unit 36 outputs the output data 50R1, 50G1, and so on, the synchronization signals 52R1, 52G1, and so on, and the synchronization signals 54R1, 54R2, and so on to the image writing circuit 26 downstream.

The synchronization signal 52B1 (output RLSO_RGB) in FIG. 6 is a signal corresponding to the automatically generated synchronization signal 46B1 (s_lso). In the case in which a synchronization signal is generated automatically, the reception unit 32 receives the automatically generated synchronization signal after a delay equal to the length of the reception period 58. The output unit 36 holds the input image signal (for example, the input data 40B1) for the duration of the reception period 58, and in accordance with the timing of the automatic reception by the reception unit 32, outputs the held input image signal (the output data 50B1 which is the same as the input data 40B1) to the image writing circuit 26 downstream. With this arrangement, the occurrence of desynchronization of the input image signal (the output data 50B1) corresponding to the automatically generated synchronization signal (desynchronization with the input image signals on the same line, namely the output data 50R1 and 50G1) is avoided.

According to the third exemplary embodiment, in the case in which a synchronization signal is not received by the reception unit 32 within the reception period, a synchronization signal is generated automatically. With this arrangement, in the case in which a synchronization signal is not received by the reception unit 32 within a predetermined period, the occurrence of image misalignment and misregistration is reduced compared to the case of not conducting the processing when a synchronization signal is received until the reception unit 32 receives the next synchronization signal.

In the case in which a synchronization signal is not received by the reception unit 32 and a synchronization signal is not generated automatically, the next synchronization signal after that synchronization signal is recognized as that synchronization signal, and as a result, image misalignment and misregistration occurs. This point will be described in detail by citing a specific example. In the example illustrated in FIG. 6, in the hypothetical case that the synchronization signal 46B1 is not generated automatically, the next synchronization signal 42R2 (the synchronization signal for R on the second line) is recognized as the synchronization signal 42B1 for B on the first line, and the input data 40R2 is recognized as the B-line input image signal for the first line. As a result, image misalignment and misregistration occurs. In contrast, according to the third exemplary embodiment, since the synchronization signal 46B1 is generated automatically, the next synchronization signal 42R2 is kept from being misrecognized as the synchronization signal 46B1, and as a result, the occurrence of image misalignment and misregistration is reduced compared to the case of not automatically generating a synchronization signal. Note that in the case in which the input data 40B1 is not received by the reception unit 32 for the first line, an output image signal is generated by the input data 40R1 and 40G1, but for the second and subsequent lines, an output image signal is generated by the R, G, B input data while also reducing the occurrence of image misalignment and misregistration.

Note that in the third exemplary embodiment, a synchronization signal may also be made up of a 1-bit signal, and the input or non-input of a synchronization signal may be recognized by "H" or "L" level.

Also, the first and third exemplary embodiments may be combined. In this case, a synchronization signal is made up of a 4-bit signal (signal pattern) similarly to the first exemplary embodiment, and the noise cancellation circuit 24B includes the recognition unit 34. For example, in the case in which a synchronization signal received by the reception unit 32 within the reception period is not recognized as a genuine synchronization signal by the recognition unit 34, the synchronization signal generation unit 40 automatically generates a synchronization signal corresponding to that synchronization signal. In so doing, a signal that is not a synchronization signal is kept from being recognized as a synchronization signal, and thus the occurrence of image misalignment and misregistration is reduced further compared to the case of not recognizing whether a synchronization signal is genuine or non-genuine. Obviously, the synchronization signal generation unit 40 also generates a synchronization signal automatically in the case in which a synchronization signal is not received by the reception unit 32 within the reception period. Also, in the case in which a synchronization signal received by the reception unit 32 within the reception period is recognized as a genuine synchronization signal by the recognition unit 34, the synchronization signal generation unit 40 does not generate a synchronization signal.

The above example deals with a color image, but may also deal with a monochrome image. Even in this case, compared to the case of not automatically generating a synchronization signal when a synchronization signal is not received by the reception unit 32, the occurrence of image misalignment caused by noise is reduced in the output image.

Note that although a line-sequential method is used in the above example, a point-sequential method may also be used. Even in this case, by automatically generating a synchronization signal in the case in which a synchronization signal is not received by the reception unit 32, in the case in which a color image is generated, the occurrence of image misalignment and misregistration is reduced compared to the case of not automatically generating a synchronization signal, while in the case in which a monochrome image is generated, the occurrence of image misalignment is reduced compared to the case of not automatically generating a synchronization signal.

Fourth Exemplary Embodiment

Figure 8:
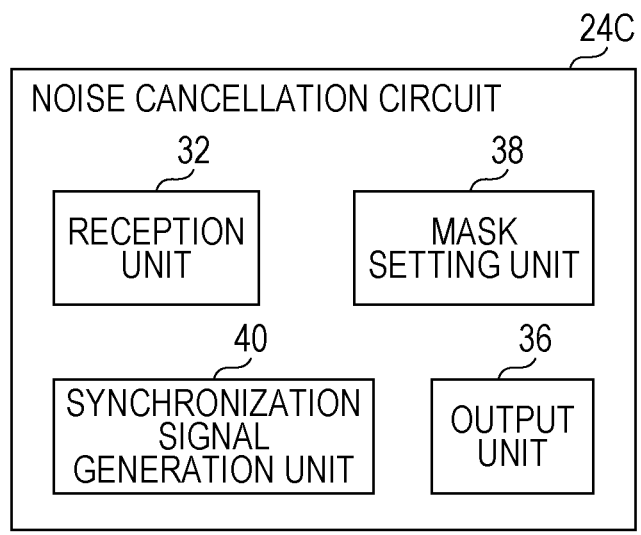
FIG. 8 is a block diagram illustrating a noise cancellation circuit according to the fourth exemplary embodiment.

Hereinafter, an image processing system according to the fourth exemplary embodiment will be described with reference to FIGS. 6 and 8. FIG. 8 is a block diagram illustrating a noise cancellation circuit 24C according to the fourth exemplary embodiment.

The image processing system according to the fourth exemplary embodiment includes the noise cancellation circuit 24C illustrated in FIG. 8 instead of the noise cancellation circuit 24 according to the first exemplary embodiment. The configuration other than the noise cancellation circuit 24C is the same as the configuration according to the first exemplary embodiment. Hereinafter, the noise cancellation circuit 24C will be described.

The noise cancellation circuit 24C includes a reception unit 32, a mask setting unit 38, a synchronization signal generation unit 40, and an output unit 36. Since the reception unit 32 and the output unit 36 are provided with the same functions as in the first exemplary embodiment, description thereof will be reduced or omitted.

Hereinafter, processing by the noise cancellation circuit 24C according to the fourth exemplary embodiment will be described with reference to FIG. 6.

Similarly to the second exemplary embodiment, after the reception unit 32 receives a synchronization signal, the mask setting unit 38 sets a mask period by treating the time of the reception as the start point. With this arrangement, the reception unit 32 does not receive a synchronization signal during the mask period, and instead receives a synchronization signal during the time after the mask period elapses but before the next mask period is set. For example, in the case in which the synchronization signal 42R1 is received by the reception unit 32, a mask period 44R1 is set in response to the reception, and during this mask period, the reception unit 32 does not receive a synchronization signal. Similarly to the second exemplary embodiment, the reception unit 32 receives input data (an input image signal) even during the mask period. After the mask period 44R1 elapses, when the synchronization signal 42G1 is input into the reception unit 32, the reception unit 32 receives the synchronization signal 42G1. After this reception, a mask period 44G1 is set. Thereafter, the process is similar.

Similarly to the third exemplary embodiment, after the reception unit 32 receives a synchronization signal, in the case in which the next synchronization signal is not received within a reception period, the synchronization signal generation unit 40 generates the next synchronization signal after the reception period elapses. For example, in the case in which the reception unit 32 does not receive the synchronization signal 42B1 within the reception period 58, after the reception period 58 elapses, the synchronization signal generation unit 40 generates the synchronization signal 46B1 corresponding to the synchronization signal 42B1. The reception unit 32 receives the synchronization signal 46B1.

In the case in which a synchronization signal is generated by the synchronization signal generation unit 40, the mask setting unit 38 sets a mask period by treating as the start point the time at which the reception unit 32 receives the generated synchronization signal. In this case, the mask setting unit 38 shortens the mask period by the length of the reception period 58. In the example illustrated in FIG. 6, a mask period 44B1 is set after the automatically generated synchronization signal 46B1, and the length of the mask period 44B1 is shortened by the length of the reception period 58. In the case in which a synchronization signal is generated by the synchronization signal generation unit 40, the reception unit 32 receives the automatically generated synchronization signal after a delay equal to the length of the reception period 58. In this case, the cycle of reception of a synchronization signal by the reception unit 32 is shifted from original cycle (a cycle corresponding to the cycle of imaging reading by the sensor 16), but by shortening the length of the mask period 44B1 by the length of the reception period 58 as above, the shifted cycle returns to the original cycle.

According to the fourth exemplary embodiment, since a synchronization signal is not received during the mask period, a synchronization signal with superimposed noise, for example, is kept from being received by the reception unit 32. With this arrangement, compared to the case of not setting a mask period, the occurrence of image misalignment and misregistration caused by noise is reduced in the output image. Also, since a synchronization signal is generated automatically in the case in which a synchronization signal is not received by the reception unit 32 within the reception period, the occurrence of image misalignment and misregistration is reduced compared to the case of not conducting the processing when a synchronization signal is received until the reception unit 32 receives the next synchronization signal. By combining the setting of a mask period with the automatic generation of a synchronization signal, the effects provided by both configurations are obtained, thereby further reducing image misalignment and misregistration.

Note that in the fourth exemplary embodiment, a synchronization signal may also be made up of a 1-bit signal, and the input or non-input of a synchronization signal may be recognized by "H" or "L" level.

Also, the first and fourth exemplary embodiments may be combined. In this case, a synchronization signal is made up of a 4-bit signal (signal pattern) similarly to the first exemplary embodiment, and the noise cancellation circuit 24C includes the recognition unit 34. For example, in the case in which a synchronization signal received by the reception unit 32 is recognized as a genuine synchronization signal by the recognition unit 34, a mask period is set by treating as the start point the time of the reception of that synchronization signal. In so doing, the incorrect setting of a mask period in accordance with a synchronization signal with superimposed noise is avoided, and compared to the case of not recognizing whether a synchronization signal is genuine or non-genuine, the mask period is set more accurately. Also, in the case in which a synchronization signal received by the reception unit 32 within the reception period is not recognized as a genuine synchronization signal by the recognition unit 34, the synchronization signal generation unit 40 automatically generates a synchronization signal corresponding to that synchronization signal. In so doing, a signal that is not a synchronization signal is kept from being recognized as a synchronization signal, and thus the occurrence of image misalignment and misregistration is reduced further compared to the case of not recognizing whether a synchronization signal is genuine or non-genuine. Obviously, the synchronization signal generation unit 40 also generates a synchronization signal automatically in the case in which a synchronization signal is not received by the reception unit 32 within the reception period.

The above example deals with a color image, but may also deal with a monochrome image. Also, as a method other than the line-sequential method, a point-sequential method may also be used.

Fifth Exemplary Embodiment

Figure 9:
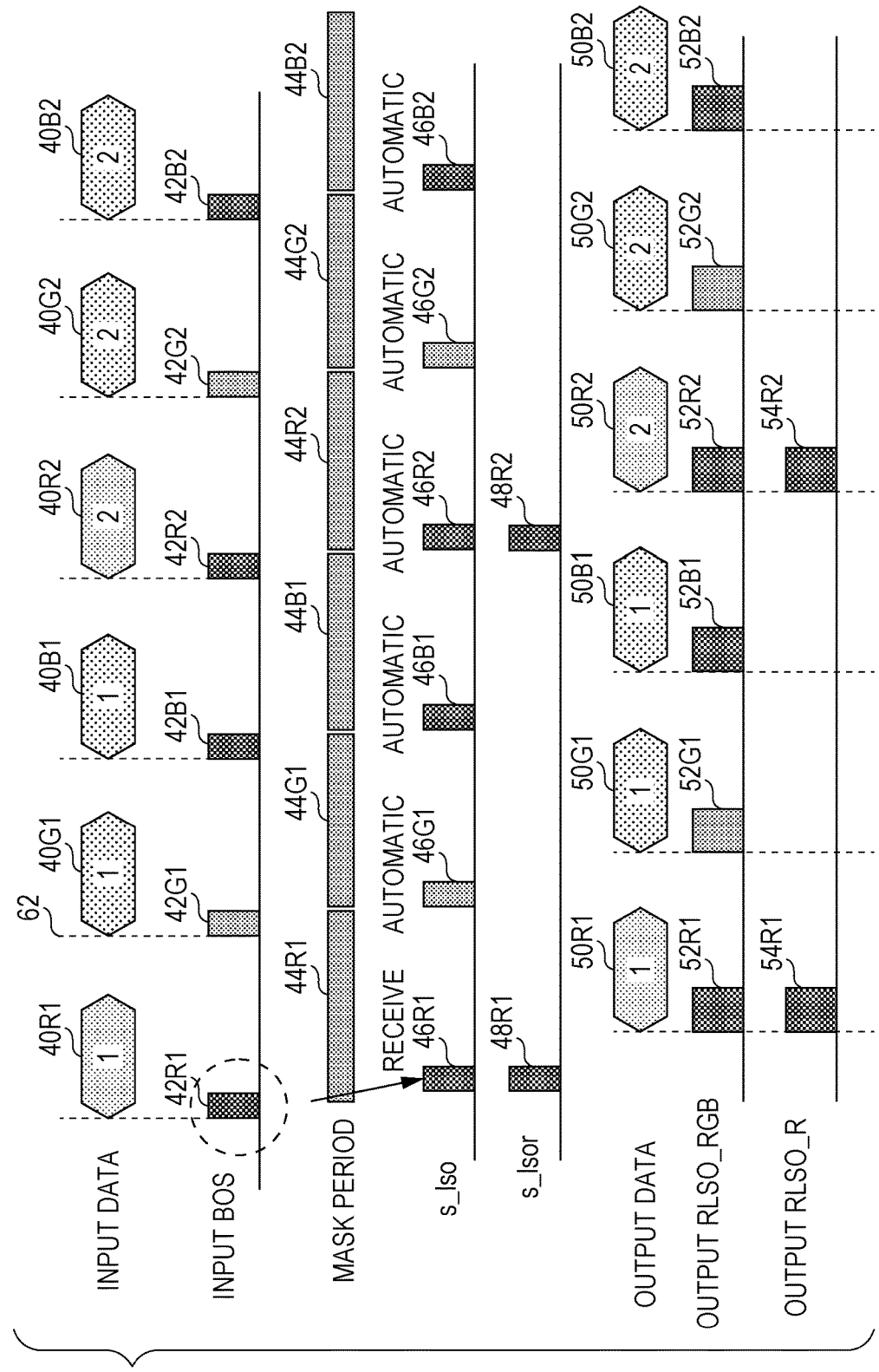
FIG. 9 is a diagram illustrating a timing chart.

Hereinafter, an image processing system according to the fifth exemplary embodiment will be described with reference to FIGS. 8 and 9. FIG. 9 is a diagram illustrating a timing chart.

The image processing system according to the fifth exemplary embodiment includes the same configuration as the image processing system according to the fourth exemplary embodiment. In the image processing system according to the fifth exemplary embodiment, the noise cancellation circuit 24C illustrated in FIG. 8 is used.

In the fifth exemplary embodiment, in the case in which the reception unit 32 receives an initial synchronization signal for a unit of image reading, the synchronization signal generation unit 40 automatically generates the subsequent synchronization signals, and the reception unit 32 receives the synchronization signals generated by the synchronization signal generation unit 40. Described more specifically, in the case in which the reception unit 32 receives the synchronization signal of the leading line (the first line) of a page targeted for image reading as the initial synchronization signal, the synchronization signal generation unit 40 automatically generates the subsequent synchronization signals, and the reception unit 32 receives the synchronization signals generated by the synchronization signal generation unit 40.

Hereinafter, processing by the noise cancellation circuit 24C according to the fifth exemplary embodiment will be described with reference to FIG. 9.

As illustrated in FIG. 9, when the reception unit 32 receives the initial synchronization signal, namely the synchronization signal 42R1, the mask setting unit 38 sets the mask period 44R1 after the reception of the synchronization signal 42R1. In the fifth exemplary embodiment, the length of the mask period 44R1 is equal to the length of one CLK. With this arrangement, since the mask period 44R1 is set to include the time 62 at which the reception unit 32 is predicted to receive the next synchronization signal, namely the synchronization signal 42G1, even if the next synchronization signal, namely the synchronization signal 42G1, is input into the reception unit 32 correctly in accordance with the image reading cycle, the reception unit 32 does not receive the synchronization signal 42G1. After the time 62 elapses, the synchronization signal generation unit 40 automatically generates a synchronization signal 46G1 corresponding to the synchronization signal 42G1. After the mask period 44R1, the mask setting unit 38 sets a mask period 44G1 corresponding to the next synchronization signal 42G1. The length of this mask period 44G1 is also equal to the length of one CLK, similarly to the mask period 44R1. With this arrangement, the reception unit 32 does not receive the next synchronization signal, namely the synchronization signal 42B1, and the synchronization signal generation unit 40 automatically generates a synchronization signal 46B1 corresponding to the synchronization signal 42B1. Thereafter, the process is similar. In other words, when the initial synchronization signal 42R1 is received by the reception unit 32, thereafter mask periods are set, and the reception unit 32 does not receive the synchronization signals sent after the synchronization signal 42R1. In this case, the synchronization signal generation unit 40 automatically generates synchronization signals corresponding to the synchronization signals sent after the synchronization signal 42R1, and the reception unit 32 receives the automatically generated synchronization signals.

The initial synchronization signal 42R1 corresponds to the synchronization signal of the leading line of a page targeted for image reading, and in the case in which the reception unit 32 receives the synchronization signal of the leading line of the page, the synchronization signal generation unit 40 generates the subsequent synchronization signals.

According to the fifth exemplary embodiment, after the initial synchronization signal 42R1 is received by the reception unit 32, the reception unit 32 receives input data (input image signals) as though synchronization signals are being input into the reception unit 32 in accordance with the predetermined image reading cycle. In so doing, even if noise is superimposed onto the second and subsequent synchronization signals, the reception of input data (input image signals) and the writing to the memory 28 are conducted without being affected by such noise. As a result, the occurrence of image misalignment and misregistration is reduced compared to the case of conducting processing only in the case in which the reception unit 32 also receives a synchronization signal for the second and subsequent synchronization signals.

Note that in the example illustrated in FIG. 9, multiple mask periods having the same length (the length of one CLK) are set, but after the reception unit 32 receives the initial synchronization signal 42R1, a single mask period that prohibits the reception of subsequent synchronization signals by the reception unit 32 thereafter may also be set. Even in this case, when a synchronization signal is generated by the synchronization signal generation unit 40, the reception unit 32 receives the synchronization signal generated by the synchronization signal generation unit 40.

In the fifth exemplary embodiment, a synchronization signal may also be made up of a 1-bit signal, and the input or non-input of a synchronization signal may be recognized by "H" or "L" level.

Also, the first and fifth exemplary embodiments may be combined. In this case, a synchronization signal is made up of a 4-bit signal (signal pattern) similarly to the first exemplary embodiment, and the noise cancellation circuit 24C includes the recognition unit 34. For example, in the case in which the initial synchronization signal 42R1 received by the reception unit 32 is recognized as a genuine synchronization signal by the recognition unit 34, or in other words, in the case in which the signal pattern included in the synchronization signal 42R1 matches the signal pattern of the synchronization signal for R, thereafter, the mask setting unit 38 sets a mask period, the synchronization signal generation unit 40 automatically generates a synchronization signal, and the reception unit 32 receives the synchronization signal generated by the synchronization signal generation unit 40. By having the recognition unit 34 recognize the synchronization signal, the synchronization signal of the leading line is identified more accurately compared to the case of not conducting such recognition. With this arrangement, the occurrence of image misalignment and misregistration is reduced further compared to the case of not recognizing the synchronization signal.

The above example deals with a color image, but may also deal with a monochrome image. Also, as a method other than the line-sequential method, a point-sequential method may also be used.

Sixth Exemplary Embodiment

Figure 10:
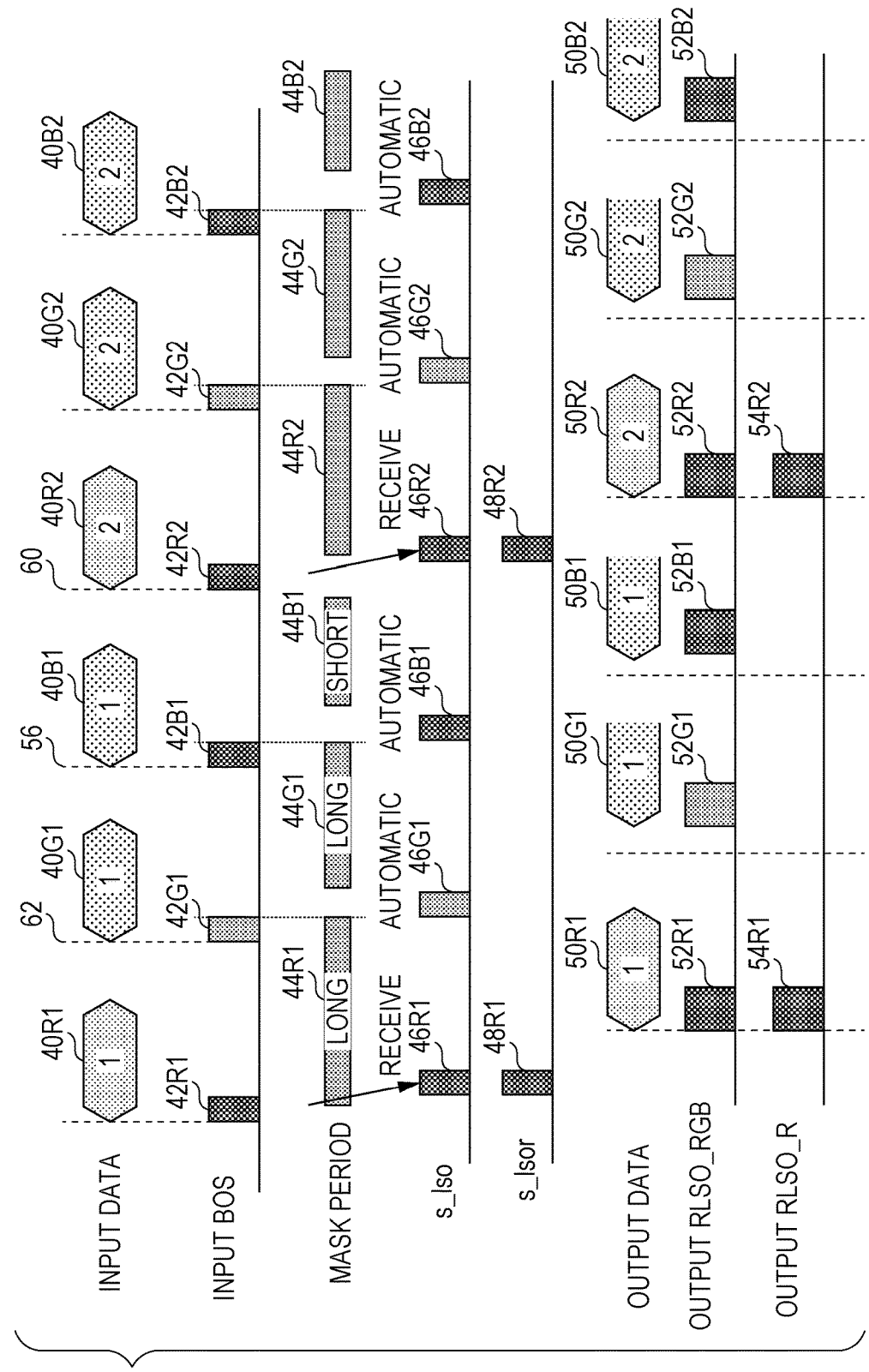
FIG. 10 is a diagram illustrating a timing chart.

Hereinafter, an image processing system according to the sixth exemplary embodiment will be described with reference to FIGS. 8 and 10. FIG. 10 is a diagram illustrating a timing chart.

The image processing system according to the sixth exemplary embodiment includes the same configuration as the image processing system according to the fourth exemplary embodiment. In the image processing system according to the sixth exemplary embodiment, the noise cancellation circuit 24C illustrated in FIG. 8 is used.

In the sixth exemplary embodiment, in the case in which the reception unit 32 receives an initial synchronization signal for a unit of image reading, the synchronization signal generation unit 40 automatically generates the subsequent synchronization signals, and the reception unit 32 receives the synchronization signals generated by the synchronization signal generation unit 40. Described more specifically, in the case in which the reception unit 32 receives the initial synchronization signal, namely the synchronization signal for R (corresponding to an example of a synchronization signal for the first color) from among the synchronization signal for R, the synchronization signal for G, and the synchronization signal for B on the same line, the synchronization signal generation unit 40 automatically generates the synchronization signal for G and the synchronization signal for B in accordance with a predetermined image reading cycle (a cycle corresponding to the length of one CLK), and the reception unit 32 receives the synchronization signal for G and the synchronization signal for B generated by the synchronization signal generation unit 40. Thereafter, the same process is repeated.

Hereinafter, processing by the noise cancellation circuit 24C according to the sixth exemplary embodiment will be described with reference to FIG. 10.

As illustrated in FIG. 10, when the reception unit 32 receives the synchronization signal for the initial color (R) on the first (initial) line, namely the synchronization signal 42R1 (the synchronization signal of the first R-line), the mask setting unit 38 sets a mask period 44R1 by treating as the start point the time of the reception of the synchronization signal 42R1. In the sixth exemplary embodiment, the mask period 44R1 is set to include the time 62 at which the reception unit 32 is predicted to receive the next synchronization signal on the first line, namely the synchronization signal 42G1 (the synchronization signal of the first G-line). In the example illustrated in FIG. 10, the mask period 44R1 is set spanning from the time at which the reception unit 32 receives the synchronization signal 42R1 until the time at which the reception unit 32 is predicted to complete reception of the next synchronization signal 42G1. With this arrangement, even if the next synchronization signal, namely the synchronization signal 42G1, is input into the reception unit 32 correctly in accordance with the predetermined image reading cycle (a cycle corresponding to the length of one CLK), the reception unit 32 does not receive the synchronization signal 42G1. After the mask period 44R1 elapses, the synchronization signal generation unit 40 automatically generates a synchronization signal 46G1 corresponding to the synchronization signal 42G1. The reception unit 32 receives the automatically generated synchronization signal 46G1.

Next, the mask setting unit 38 sets a mask period 44G1 corresponding to the synchronization signal 42G1 on the first line by treating as the start point the time at which the reception unit 32 receives the synchronization signal 46G1. The mask period 44G1 is set to include a time 56 at which the reception unit 32 is predicted to receive the next synchronization signal on the first line, namely the synchronization signal 42B1 (the synchronization signal of the first B-line). In the example illustrated in FIG. 10, the mask period 44G1 is set spanning from the time at which the reception unit 32 receives the synchronization signal 46G1 until the time at which the reception unit 32 is predicted to complete reception of the next synchronization signal 42B1. With this arrangement, even if the next synchronization signal, namely the synchronization signal 42B1, is input into the reception unit 32 correctly in accordance with the predetermined image reading cycle (a cycle corresponding to the length of one CLK), the reception unit 32 does not receive the synchronization signal 42B1. After the mask period 44G1 elapses, the synchronization signal generation unit 40 automatically generates a synchronization signal 46B1 corresponding to the synchronization signal 42B1. The reception unit 32 receives the automatically generated synchronization signal 46B1.

The mask period 44R1 corresponding to the synchronization signal for R is set by treating as the start point the time at which the reception unit 32 receives the synchronization signal 42R1, while the mask period 44G1 corresponding to the synchronization signal for G is set by treating as the start point the time at which the reception unit 32 receives the automatically generated synchronization signal 46G1. Since the mask period 44G1 is set by treating as the start point the time at which the synchronization signal 46G1 is automatically generated and received by the reception unit 32, the mask period 44G1 is set by treating as the start point a time after the time at which the reception unit 32 is predicted to receive the original synchronization signal 42G1. For this reason, the length of the mask period 44G1 is shorter than the length of the mask period 44R1 set previously.

Next, the mask setting unit 38 sets a mask period 44B1 corresponding to the synchronization signal 42B1 by treating as the start point the time at which the reception unit 32 receives the synchronization signal 46B1. The mask period 44B1 is set not to include the time 60 at which the reception unit 32 is predicted to receive the synchronization signal for the second (next) line, namely the synchronization signal 42R2. In the example illustrated in FIG. 10, the mask period 44B1 is set spanning from the time at which the reception unit 32 receives the synchronization signal 46B1 until a time before the time at which the reception unit 32 is predicted to receive the synchronization signal for the second line, namely the synchronization signal 42R2 (the synchronization signal of the second R-line). With this arrangement, in the case in which the synchronization signal for the initial color (R) on the second line, namely the synchronization signal 42R2, is input into the reception unit 32 correctly in accordance with the predetermined image reading cycle (a cycle corresponding to the length of one CLK), the synchronization signal 42R2 is received by the reception unit 32. In this way, when the reception unit 32 receives the synchronization signal 42R2 for the second line, similarly to the first line, mask periods 44R2, 44G2, and 44B2 are set, and a synchronization signal 46G2 for G and a synchronization signal 46B2 for B are generated automatically. The reception unit 32 receives the automatically generated synchronization signals 46G2 and 46B2. The subsequent lines are also similar.

As above, in the sixth exemplary embodiment, the reception of a synchronization signal for R, and the automatic generation and reception of a synchronization signal for G and a synchronization signal for B, are executed in units of lines. In the case in which a synchronization signal for the initial color (R) for each line is received by the reception unit 32, the reception unit 32 receives input data (input image signals) as though synchronization signals for the other colors (G, B) are being input in accordance with the predetermined cycle. In so doing, even noise is superimposed onto the synchronization signals for two out of three colors (namely, the second color and the third color), the reception of input data (input image signals) and the writing to the memory 28 are conducted without being affected by such noise. As a result, the occurrence of image misalignment and misregistration is reduced compared to the case of conducting processing only in the case in which the reception unit 32 also receives synchronization signals for the second color and the third color. Also, by processing in units of lines, incorrect operation caused by the noise or the like is concluded on a single line, while the images of other lines remain unaffected.

Also, in the sixth exemplary embodiment, on each line, mask periods having a different length for each color are set. Specifically, from the initial color (R) to the second color (G) and the third color (B), respective mask periods are set in which the length gradually becomes shorter. By setting mask periods in this way, the synchronization signals for the second color (G) and the third color (B) are kept from being received by the reception unit 32, and in addition, the initial color (R) for the second and subsequent lines is received by the reception unit 32. With this arrangement, the reception of a synchronization signal for R, and the automatic generation and reception of a synchronization signal for G and a synchronization signal for B, are executed correctly in units of lines.

In the sixth exemplary embodiment, a synchronization signal may also be made up of a 1-bit signal, and the input or non-input of a synchronization signal may be recognized by "H" or "L" level.

Also, the first and sixth exemplary embodiments may be combined. In this case, a synchronization signal is made up of a 4-bit signal (signal pattern) similarly to the first exemplary embodiment, and the noise cancellation circuit 24C includes the recognition unit 34. For example, in the case in which the synchronization signal 42R1 for the initial color (R) received by the reception unit 32 is recognized as a genuine synchronization signal by the recognition unit 34, or in other words, in the case in which the signal pattern included in the synchronization signal 42R1 matches the prescribed pattern of the synchronization signal for R, the mask setting unit 38 sets the mask period 44R1, the synchronization signal generation unit 40 generates the synchronization signal 46G1 for G, and the reception unit 32 receives the synchronization signal 46G1. Thereafter, the process is similar. Likewise for the second and subsequent lines, in the case in which the synchronization signal for the initial color (R) is recognized as a genuine synchronization signal, the setting of mask periods and the automatic generation of synchronization signals are conducted. By having the recognition unit 34 recognize the synchronization signal, the synchronization signal for the initial color on each line is identified more accurately compared to the case of not conducting such recognition. With this arrangement, the occurrence of image misalignment and misregistration is reduced compared to the case of not recognizing the synchronization signal.

The above example deals with a color image, but may also deal with a monochrome image. Also, as a method other than the line-sequential method, a point-sequential method may also be used.

Note that in the case in which a synchronization signal is generated automatically, the reception unit 32 receives the automatically generated synchronization signal after a delay equal to the time taken by the automatic generation. In this case, the output unit 36 holds the input data (input image signal) for the duration of the delay time, and in accordance with the timing of the automatic reception by the reception unit 32, outputs the held input data to the image writing circuit 26 downstream. With this arrangement, the occurrence of desynchronization of an input image signal corresponding to an automatically generated synchronization signal is avoided.

Seventh Exemplary Embodiment

Figure 11:
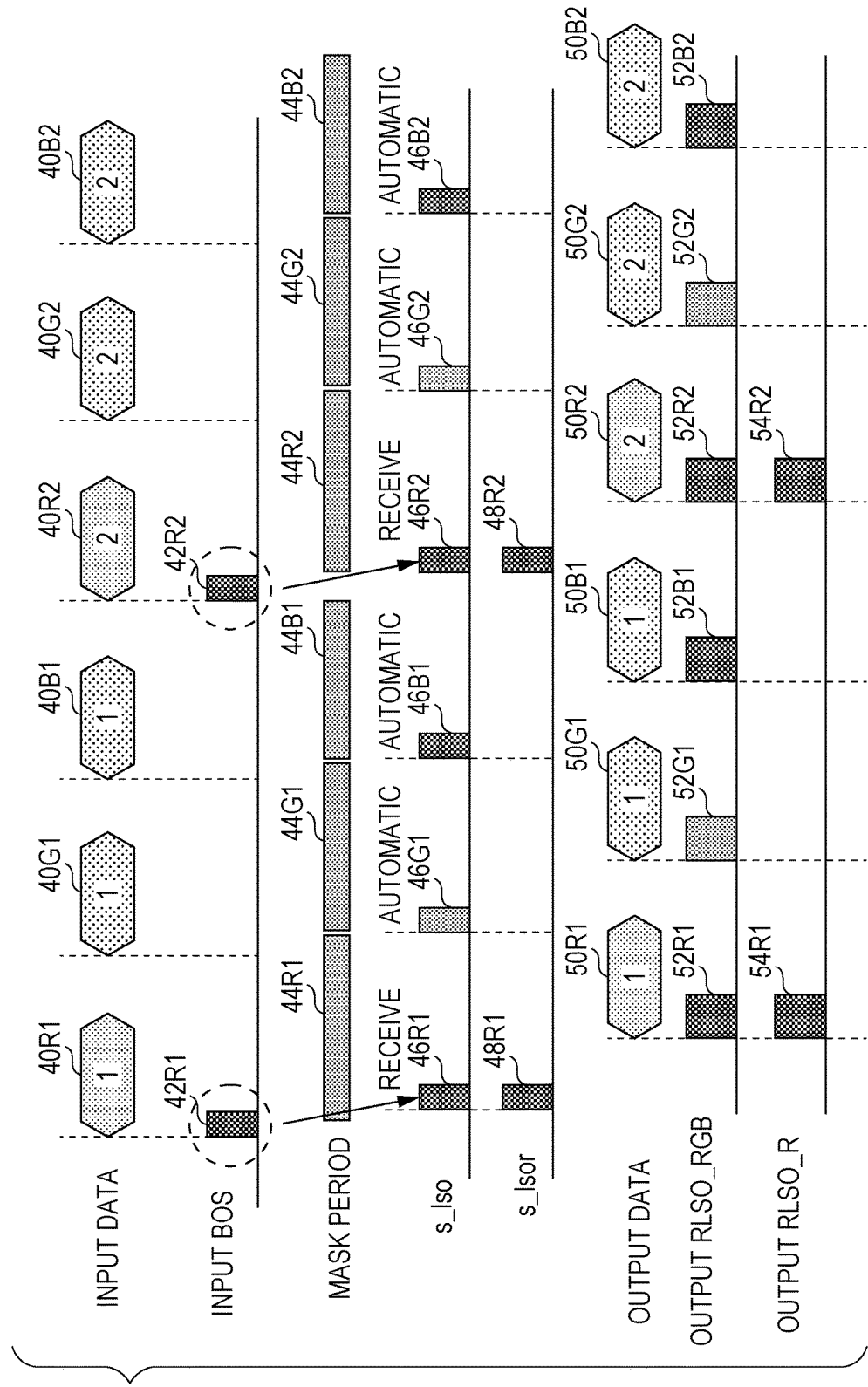
FIG. 11 is a diagram illustrating a timing chart.

Hereinafter, an image processing system according to the seventh exemplary embodiment will be described with reference to FIGS. 8 and 11. FIG. 11 is a diagram illustrating a timing chart.

The image processing system according to the seventh exemplary embodiment includes the same configuration as the image processing system according to the fourth exemplary embodiment. In the image processing system according to the seventh exemplary embodiment, the noise cancellation circuit 24C illustrated in FIG. 8 is used.

Hereinafter, processing by the noise cancellation circuit 24C according to the seventh exemplary embodiment will be described with reference to FIG. 11.

In the seventh exemplary embodiment, a synchronization signal is generated only for a specific color, and not generated for colors other than the specific color. The specific color is R (red), for example, and in the AFE 18, only the synchronization signal for R is generated, while the synchronization signals for G and B are not generated. As illustrated in FIG. 11, the synchronization signals 42R1, 42R2, and so on for R are input into the reception unit 32, and the reception unit 32 receives the synchronization signals 42R1, 42R2, and so on for R. When the reception unit 32 receives a synchronization signal for R, the synchronization signal generation unit 40 automatically generates a synchronization signal for G and a synchronization signal for B in accordance with a predetermined image reading cycle (a cycle corresponding to the length of one CLK), and the reception unit 32 receives the synchronization signal for G and the synchronization signal for B generated by the synchronization signal generation unit 40. Thereafter, the same process is repeated.

Note that the mask setting unit 38 may also set a mask period other than in a period in which the reception unit 32 is predicted to receive the synchronization signal for R, in accordance with a predetermined image reading cycle (a cycle corresponding to the length of one CLK). With this arrangement, a signal that is not a synchronization signal is kept from being received by the reception unit 32 as a synchronization signal, and thus the occurrence of image misalignment and misregistration is reduced compared to the case of not setting a mask period.

The mask setting unit 38 sets a mask period until before the time at which the reception unit 32 is predicted to receive the next synchronization signal for R, and in the case in which the reception unit 32 receives the next synchronization signal for R, the next mask period may be set by treating as the start point the time at which the reception unit 32 receives the synchronization signal for R. By setting a mask period in this way, for example, even if a mask period would be set incorrectly to a period in which the reception unit 32 is predicted to receive a synchronization signal for R as a result of noise being superimposed onto the base clock signal (CLK), a mask period is not set until the reception unit 32 receives the next synchronization signal for R, and that next synchronization signal for R is received by the reception unit 32. With this arrangement, even if a discrepancy is produced between the mask period and the reception period of a synchronization signal by the reception unit 32, when a later synchronization signal for R is received by the reception unit 32, the discrepancy between the mask period and the reception period is addressed at that time, and the mask period and the reception period are synchronized correctly.

Note that a mask period may also not be set. In this case, the mask setting unit 38 is not included in the noise cancellation circuit 24C.

As above, according to the seventh exemplary embodiment, in the case in which a synchronization signal for a specific color (R) for each line is received by the reception unit 32, the reception unit 32 receives input data (input image signals) as though synchronization signals for the other colors (G, B) are being input in accordance with the predetermined cycle. In so doing, the occurrence of image misalignment and misregistration is reduced compared to the case of also generating synchronization signals for the second and third colors, and conducting processing only in the case in which the reception unit 32 also receives those synchronization signals.

In the seventh exemplary embodiment, a synchronization signal may also be made up of a 1-bit signal, and the input or non-input of a synchronization signal may be recognized by "H" or "L" level.

Also, the first and seventh exemplary embodiments may be combined. In this case, a synchronization signal is made up of a 4-bit signal (signal pattern) similarly to the first exemplary embodiment, and the noise cancellation circuit 24C includes the recognition unit 34. For example, in the case in which the synchronization signal 42R1 received by the reception unit 32 is recognized as a genuine synchronization signal (a synchronization signal for a specific color) by the recognition unit 34, or in other words, in the case in which the signal pattern included in the synchronization signal 42R1 matches the prescribed pattern of the synchronization signal for R, the synchronization signal generation unit 40 generates the synchronization signal 46G1 for G and the synchronization signal 46B1 for B. Thereafter, the process is similar. Likewise for the second and subsequent lines, in the case in which the synchronization signal for the specific color (R) is recognized as a genuine synchronization signal, the automatic generation of synchronization signals is conducted. Also, in the case in which a synchronization signal received by the reception unit 32 is recognized as a genuine synchronization signal, the mask setting unit 38 may also set a mask period. By having the recognition unit 34 recognize the synchronization signal, the synchronization signal for the specific color is identified more accurately compared to the case of not conducting such recognition. With this arrangement, the occurrence of image misalignment and misregistration is reduced compared to the case of not recognizing the synchronization signal.

The above example deals with a color image, but may also deal with a monochrome image. Also, as a method other than the line-sequential method, a point-sequential method may also be used.

The above image processing circuit 20 is realized by the cooperative action of hardware and software as an example. Specifically, the image processing circuit 20 is provided with one or multiple processors such as CPUs (not illustrated). By having the one or multiple processors load and execute a program stored in a storage device (not illustrated), the functions of the respective units of the image processing circuit 20 are realized. The program is stored in the storage device via a recording medium such as a CD or DVD, or alternatively, via a communication link such as a network. As another example, the respective units of the image processing circuit 20 may be realized by hardware resources such as a processor, an electronic circuit, an application-specific integrated circuit (ASIC), or a system on a chip (SOC), for example. A device such as memory may also be used in such a realization. As yet another example, the respective units of the image processing circuit 20 may also be realized by a digital signal processor (DSP), a field-programmable gate array (FPGA), or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing device comprising:
    a processor programmed to function as:
    a reception unit that receives an input image signal, and a synchronization signal used to generate an output image signal on a basis of the input image signal; and
    an output unit that outputs the input image signal received by the reception unit, wherein
    in a case in which, after receiving the synchronization signal, the reception unit does not receive a next synchronization signal within a predetermined reception period, the reception unit conducts an automatic reception process that treats the next synchronization signal as being received, and
    in a case in which the next synchronization signal is automatically received, the output unit delays an output timing of the input image signal corresponding to the next synchronization signal compared to a case in which the next synchronization signal is received by the reception unit within the reception period.

2. The image processing device according to claim 1, wherein the processor is further programmed to function as:
    a generation unit that generates the next synchronization signal in a case in which the reception unit does not receive the next synchronization signal within the reception period after receiving the synchronization signal, and wherein
    the reception unit receives the next synchronization signal generated by the generation unit as the automatic reception process.

3. The image processing device according to claim 2, wherein the processor is further programmed to function as:
    a setting unit that sets, after the reception unit receives the synchronization signal, a reception prohibition period that prohibits reception of a different synchronization signal by the reception unit.

4. The image processing device according to claim 3, wherein
    the setting unit shortens a length of the reception prohibition period set after the reception of the automatically received next synchronization signal to less than the length of the reception prohibition period set after the reception of the next synchronization signal received by the reception unit within the reception period.

5. The image processing device according to claim 1, wherein
    in a case in which the next synchronization signal is automatically received, the output unit delays, by an amount equal to the reception period, an output timing of the input image signal corresponding to the next synchronization signal compared to a case in which the next synchronization signal is received by the reception unit within the reception period.

6. A non-transitory computer-readable medium storing a program causing a computer to execute a process for processing an image, the process comprising:
    receiving an input image signal, and a synchronization signal used to generate an output image signal on a basis of the input image signal;
    outputting the input image signal received by the reception unit;
    conducting, in a case in which, after receiving the synchronization signal, a next synchronization signal is not received within a predetermined reception period, an automatic reception process that treats the next synchronization signal as being received; and
    delaying, in a case in which the next synchronization signal is automatically received, an output timing of the input image signal corresponding to the next synchronization signal compared to a case in which the next synchronization signal is received by the reception unit within the reception period.

* * * * *